(12) United States Patent
Gassho et al.

(10) Patent No.: US 7,174,157 B2
(45) Date of Patent: Feb. 6, 2007

(54) WIRELESS COMMUNICATION DEVICE

(75) Inventors: Kazuhito Gassho, Nagano-ken (JP); Susumu Shiohara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 539 days.

(21) Appl. No.: 10/289,455

(22) Filed: Nov. 7, 2002

(65) Prior Publication Data

US 2003/0092395 A1    May 15, 2003

(30) Foreign Application Priority Data

Nov. 14, 2001   (JP)  ............................. 2001-348240

(51) Int. Cl.
*H04M 1/66* (2006.01)
(52) U.S. Cl. .................. 455/410; 455/41.2; 455/426.1; 455/552.1
(58) Field of Classification Search ........ 455/410–411, 455/426.1, 426.2, 41.1–41.3, 552.1, 553.1, 455/552.3; 380/247, 270; 713/168–172
See application file for complete search history.

(56) References Cited

U.S. PATENT DOCUMENTS

2001/0007815 A1* 7/2001 Philipsson .................. 455/41

2002/0065065 A1* 5/2002 Lunsford et al. ........... 455/411
2004/0203592 A1* 10/2004 Kermode et al. ........... 455/411

FOREIGN PATENT DOCUMENTS

JP        2000-224156 A        8/2000

* cited by examiner

*Primary Examiner*—Lee Nguyen
(74) *Attorney, Agent, or Firm*—Sughrue Mion, PLLC

(57) ABSTRACT

A standard communication module establishes communication with another wireless communication device via radio waves. A short distance communication module utilizes weaker radio waves than the radio waves used by the standard communication module, in order to establish communication with another wireless communication device. A communication control module activates the short distance communication module to transmit setting parameters, which are used to change settings required for communication in another wireless communication device. This arrangement effectively prevents leakage of the setting parameters to any third person who is beyond the communicable range of the short distance communication module, thus ensuring security for settings in the wireless communication device in a wireless environment.

7 Claims, 6 Drawing Sheets

WIRELESS COMMUNICATION DEVICE

BACKGROUND OF THE INVENTION

1. Field of the Invention

The present invention relates to a wireless communication device that establishes communication by radio. More specifically the invention pertains to a technique of carrying out settings for establishment of communication between wireless communication devices.

2. Description of the Related Art

Wireless LANs have become popular, in which computers are connected to a print server via wireless communication devices. In the wireless LAN, setting information in each wireless communication device is required for establishment of communication. The setting information includes selection of a communication mode, for example, an ADHOC mode or an infrastructure mode, a communication channel, an ESS-ID, and a code key called WEP and used for code communication.

Some wireless communication devices, for example, a print server or an access point, may not have an interface to implement the settings. In such cases, the information is transmitted by radio from another wireless communication device to the wireless communication device without the interface for settings.

It is desirable to keep the setting information in secrecy. Leakage of the setting information to any third person may result in leakage of the contents of communication by the wireless LAN. The secrecy of the setting information has, however, been not fully considered in the settings for wireless transmission. This problem is not limited to the wireless LAN, but is commonly found in the case of settings in a wireless communication device by radio communication.

SUMMARY OF THE INVENTION

The object of the present invention is thus to ensure security for settings in a wireless communication device in a wireless environment.

In order to attain at least part of the above and other related objects, the present invention is directed to a wireless communication device, which includes: a standard communication module that establishes communication with another wireless communication device via radio waves; a short distance communication module that utilizes weaker radio waves than the radio waves used by the standard communication module, in order to establish communication with another wireless communication device; and a communication control module that switches over active communication between the standard communication module and the short distance communication module. The communication control module activates the short distance communication module to transmit setting parameters, which are used to change settings required for communication in another wireless communication device.

The wireless communication device of the present invention selectively uses the standard communication module and the short distance communication module in response to a transmitted signal. In the case of transmitting the setting parameters, which are used to change settings required for communication in another wireless communication device, the wireless communication device activates the short distance communication module, which establishes communication via weaker radio waves than the radio waves used by the standard communication module. This arrangement effectively prevents leakage of the setting parameters, which may include important parameters, such as the code information, to any third person who is beyond the communicable range of the short distance communication module. The standard communication module is used to transmit information other than the setting parameters.

In one preferable application of the wireless communication device of the invention, the communication control module activates the short distance communication module to transmit the setting parameters, in response to an external transmission instruction of the setting parameters.

In the wireless communication device of this application, the short distance communication module is used to transmit the setting parameters, in response to an external transmission instruction. The external transmission instruction may be a user's transmission instruction or a transmission instruction sent from another drive that utilizes the wireless communication device. This arrangement ensures flexible use of the wireless communication device.

In another preferable application of the wireless communication device of the invention, the setting parameters include key information used for encoding and decoding data in the process of communication with another wireless communication device.

The wireless communication device of this arrangement effectively prevents leakage of the key information to any third person.

In still another preferable application of the wireless communication device of the invention, the setting parameters include group information for identifying a network group to be entered.

The wireless communication device of this arrangement effectively prevents any unexpected third person from illegally intercepting the group information and invading the network group.

In another preferable application of the wireless communication device of the invention, the communication control module activates the standard communication module, after transmission of the setting parameters by the short distance communication module.

The wireless communication device of this arrangement automatically changes over the active communication to the standard communication module, after transmission of the setting parameters. This ensures quick transmission of information other than the setting parameters.

The present invention is also directed to a wireless equipment setting device that utilizes the wireless communication device discussed above to carry out settings required for communication in another wireless communication device. The wireless equipment setting device includes: a setting parameters storage module that stores the setting parameters; a selection signal transmission module that transmits a selection signal for selecting either one of the standard communication module and the short distance communication module to the communication control module; and a setting parameters transmission module that transmits the setting parameters to the communication control module.

The wireless equipment setting device utilizes the wireless communication device to transmit the setting parameters to another wireless communication device.

When the wireless equipment setting device is constructed by the computer, one possible application of the present invention is a program that causes the computer to attain the functions of the wireless equipment setting device. The program may be recorded in a diversity of recording media, such as a flexible disk, a CD-ROM, a DVD, an MO, an IC card, a ROM cartridge, or a hard disk.

The above and other objects, features, aspects, and advantages of the present invention will become more apparent from the following detailed description of the preferred embodiments with the accompanying drawings.

DESCRIPTION OF THE PREFERRED EMBODIMENTS

Figure 1:
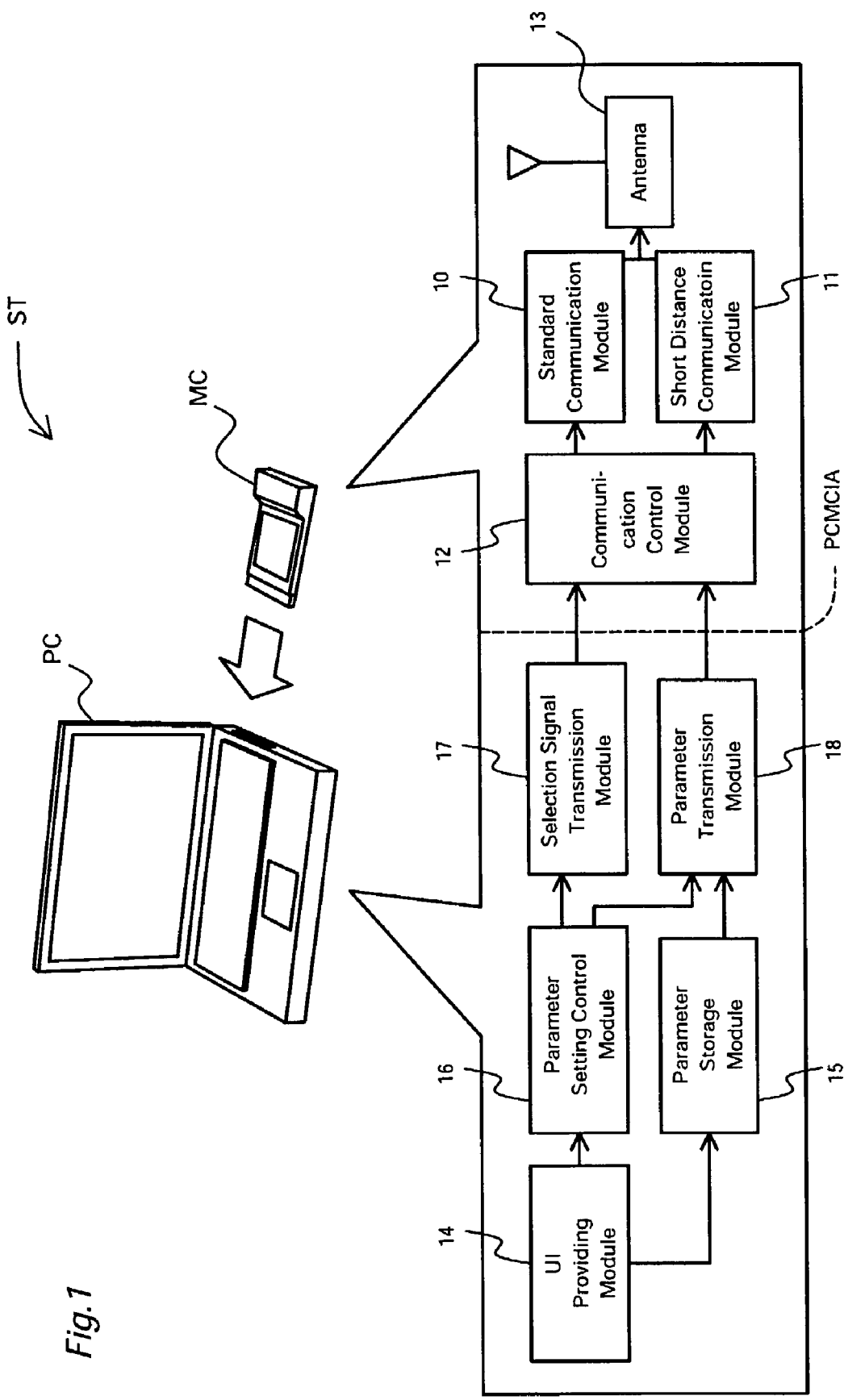
FIG. 1 schematically illustrates the construction of a station ST used for settings in an external wireless communication device in one embodiment of the present invention.

Some modes of carrying out the invention are discussed below with reference to drawings as preferred embodiments in the following sequence:

A. First Embodiment
  (A1) Schematic Structure of Station
  (A2) Outline of Functions of Station
  (A3) Transmission Process of Setting Parameters B. Second Embodiment
  (B1) Schematic Structure of Access Point
  (B2) Outline of Functions of Access Point
  (B3) Transmission Process of Setting Parameters C. Modifications A. First Embodiment (A1) Schematic Structure of Station FIG. 1 schematically illustrates the construction of a station ST used for settings in an external wireless communication device in one embodiment of the present invention. The station ST includes a personal computer PC and a wireless communication card MC. The personal computer PC has a CPU, a RAM, a ROM, a hard disk, a display, a keyboard, and a PCMCIA interface for connecting with diverse PC cards.

The wireless communication card MC is connected with the PCMCIA interface of the personal computer PC. The wireless communication card MC has a PCMCIA interface for connecting with the personal computer PC, a standard communication module 10, a short distance communication module 11, a communication control module 12, and an antenna 13. The standard communication module 10 has a circuit structure for communication via radio waves. The short distance communication module 11 has a circuit structure for communication via weaker radio waves than the radio waves utilized by the standard communication module 10. In this embodiment, the short distance communication module 11 is capable of transmitting radio waves to a range of approximately 3 meters around. The communication control module 12 controls the operations of the standard communication module 10 and the short distance communication module 11 and relays data transmission.

Diverse standards and systems are applicable for communication via radio waves. In this embodiment, wireless communication is based on IEEE802.11b, which is the standard of wireless LANs. The standard IEEE802.11b utilizes radio waves in a frequency domain of 2.4 GHz and establishes communication between wireless communication devices according to a spread spectrum communication method called a DSSS system.

(A2) Outline of Functions of Station

The station ST has several functions for settings in a wireless communication device. The personal computer PC of the station ST has a user interface providing module 14, a parameter storage module 15, a parameter setting control module 16, a selection signal transmission module 17, and a parameter transmission module 18 as its functions. These functions are actualized by installation of a utility software program for the wireless communication card MC in the personal computer PC. The personal computer PC has a function of installing such a software program via a recording medium like a CD-ROM or via a network, although this function is not specifically illustrated.

Figure 2:
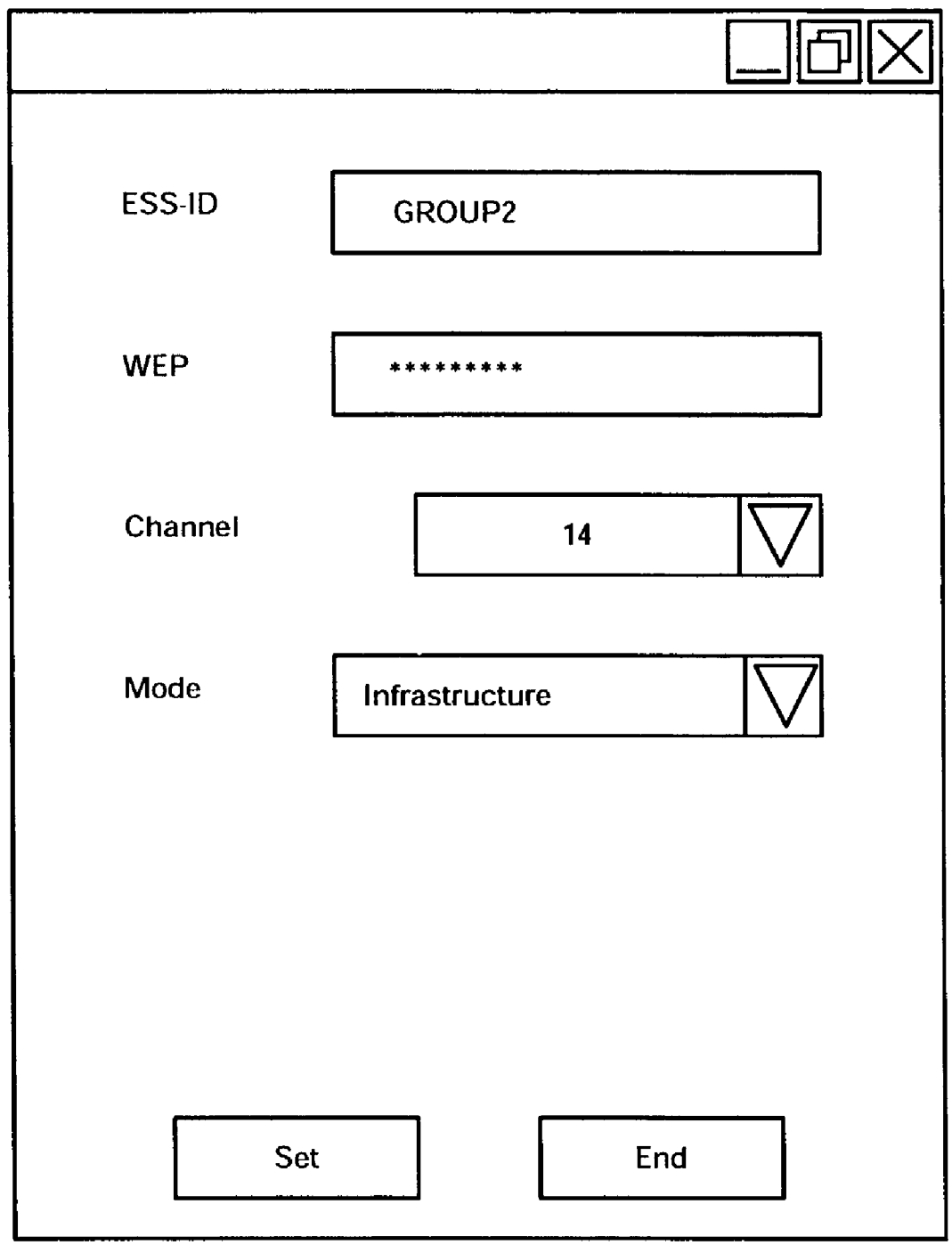
FIG. 2 shows an example of a GUI.

The user interface providing module 14 provides a graphical user interface (GUI) on the display for receiving various inputs and instructions given by the user. FIG. 2 shows an example of the GUI. 'ESS-ID' on the GUI represents group information for identifying a wireless network group, which the user enters. Communication is allowed between wireless communication devices with the setting of an identical ESS-ID. 'WEP' represents key information used for encoding and decoding data transmitted and received. Data transmission is allowed only between wireless communication devices with the setting of an identical WEP. As shown in the example of the GUI, any setting of the key information is expressed by asterisks like '********', in order to prevent any third person from illegally acquiring the key information. 'Channel' is the parameter for specifying a radio frequency used for communication. The standard IEEE802.11b has 14 channels. 'Mode' is the parameter for specifying the communication system. The standard IEEE802.11b has two modes 'infrastructure mode' and 'ADHOC mode'. The infrastructure mode establishes all communications via a relay station called an access point. The ADHOC mode establishes direct communication between wireless communication devices without the access point.

It is not necessary to input all these parameters. Required parameters should be input according to the user's network environment and the selected mode. In the case of a computer that can not utilize the GUI, the required parameters may be input as commands.

The settings of the parameters input by the user via the user interface providing module 14 are stored in the parameter storage module 15. The setting parameters are also transmitted to the communication control module 12 of the wireless communication card MC via the parameter transmission module 18 and are stored in a flash memory of the wireless communication card MC. The wireless communication card MC carries out communication based on the settings of these parameters.

The station ST of the embodiment has a function of transmitting the setting parameters by radio to implement settings in another wireless communication device. The settings of the parameters to be transmitted to another wireless communication device may be different from the settings in the wireless communication card MC.

The parameter setting control module 16 controls the selection signal transmission module 17 and the parameter transmission module 18, in response to a setting instruction given by the user interface providing module 14. In the example of FIG. 2, the setting instruction is given in response to a press of a 'Set' button. In the case of transmission of the setting parameters in response to the setting instruction, the parameter setting control module 16 gives an instruction of selecting the short distance communication module 11 to the selection signal transmission module 17. In the case of transmission of other data, on the other hand, the parameter setting control module 16 gives an instruction of selecting the standard communication module 10 to the selection signal transmission module 17.

The selection signal transmission module 17 transmits the selection of activating which communication circuit, the standard communication module 10 or the short distance communication module 11, to the communication control module 12 of the wireless communication card MC, in response to an instruction given by the parameter setting control module 16.

The parameter transmission module 18 reads the settings of the parameters stored in the parameter storage module 15 in response to the instruction given by the parameter setting control module 16, and transmits the setting parameters to the communication control module 12 of the wireless communication card MC.

The communication control module 12 of the wireless communication card MC uses the communication circuit activated in response to the selection transmitted from the selection signal transmission module 17, and transmits the setting parameters, which have been sent from the parameter transmission module 18, via the antenna 13 to the external wireless communication device.

(A3) Transmission Process of Setting Parameters

Figure 3:
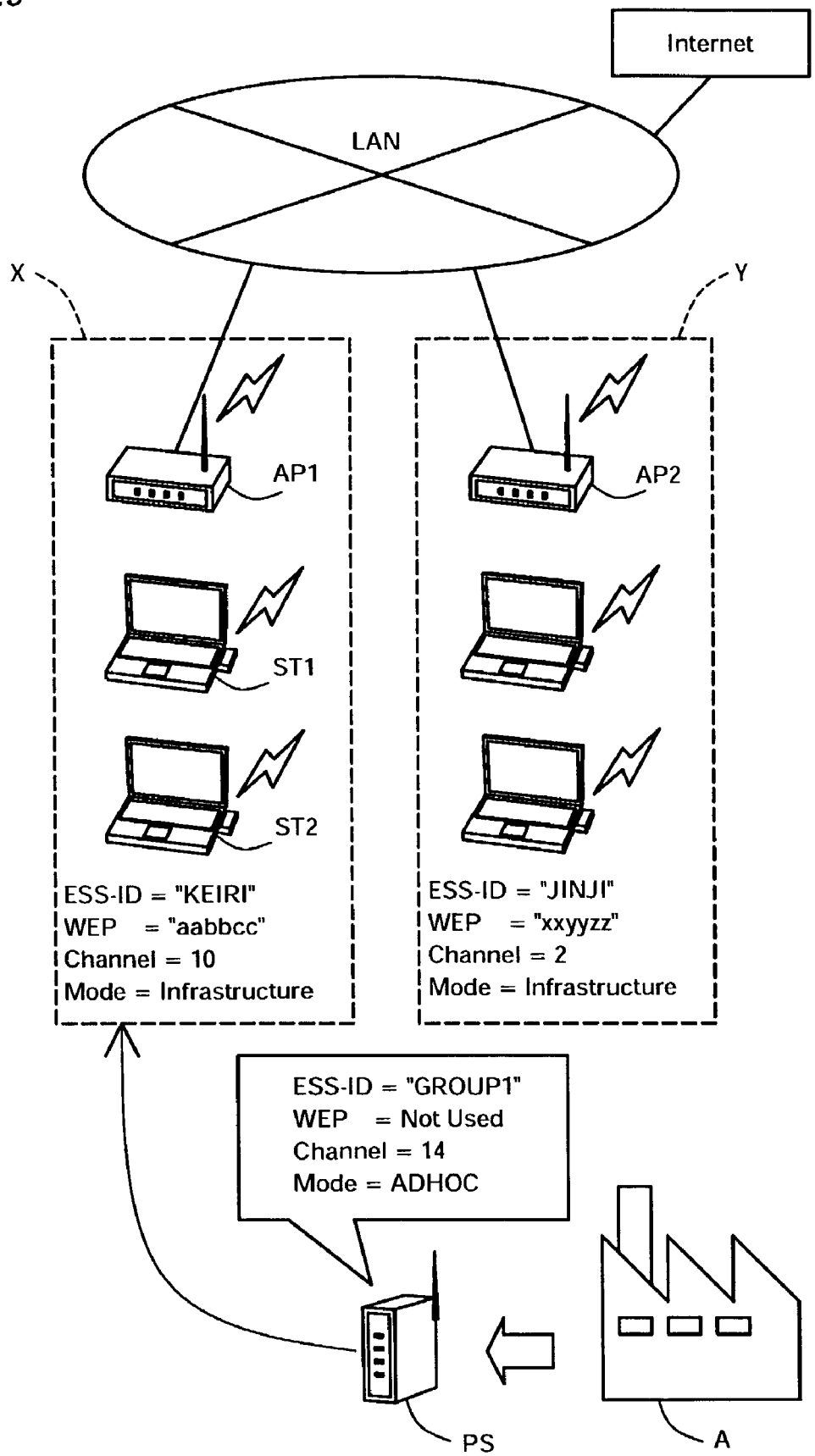
FIG. 3 shows one state in which a parameters transmission process is executed.

The following describes a process of transmitting the setting parameters, which is executed by the station ST. FIG. 3 shows one state in which the parameters transmission process is executed. In this embodiment, setting parameters for entry in a wireless network group X are transmitted by radio from a station ST1 to a radio print server PS, which is set in an initial factory shipment state. The radio print server PS receives print data from stations ST via wireless communication and causes a printer connected via a cable to print the input print data. The initial settings of the parameters in the radio print server PS are ESS-ID='GROUP 1', WEP='Not Used', Channel='14', and Communication Mode='ADHOC'. The user is notified of the initial settings of these parameters by an instructions manual. The wireless network group X is constructed by an access point AP1 and stations ST1 and ST2. The wireless network group X works under the settings, ESS-ID='KEIRI', WEP='aabbcc', Channel='10', and Communication Mode='Infrastructure'. The wireless network group X is linked with another wireless network group Y via access points AP1 and AP2 by a wired LAN, which is further connected to the Internet.

Figure 4:
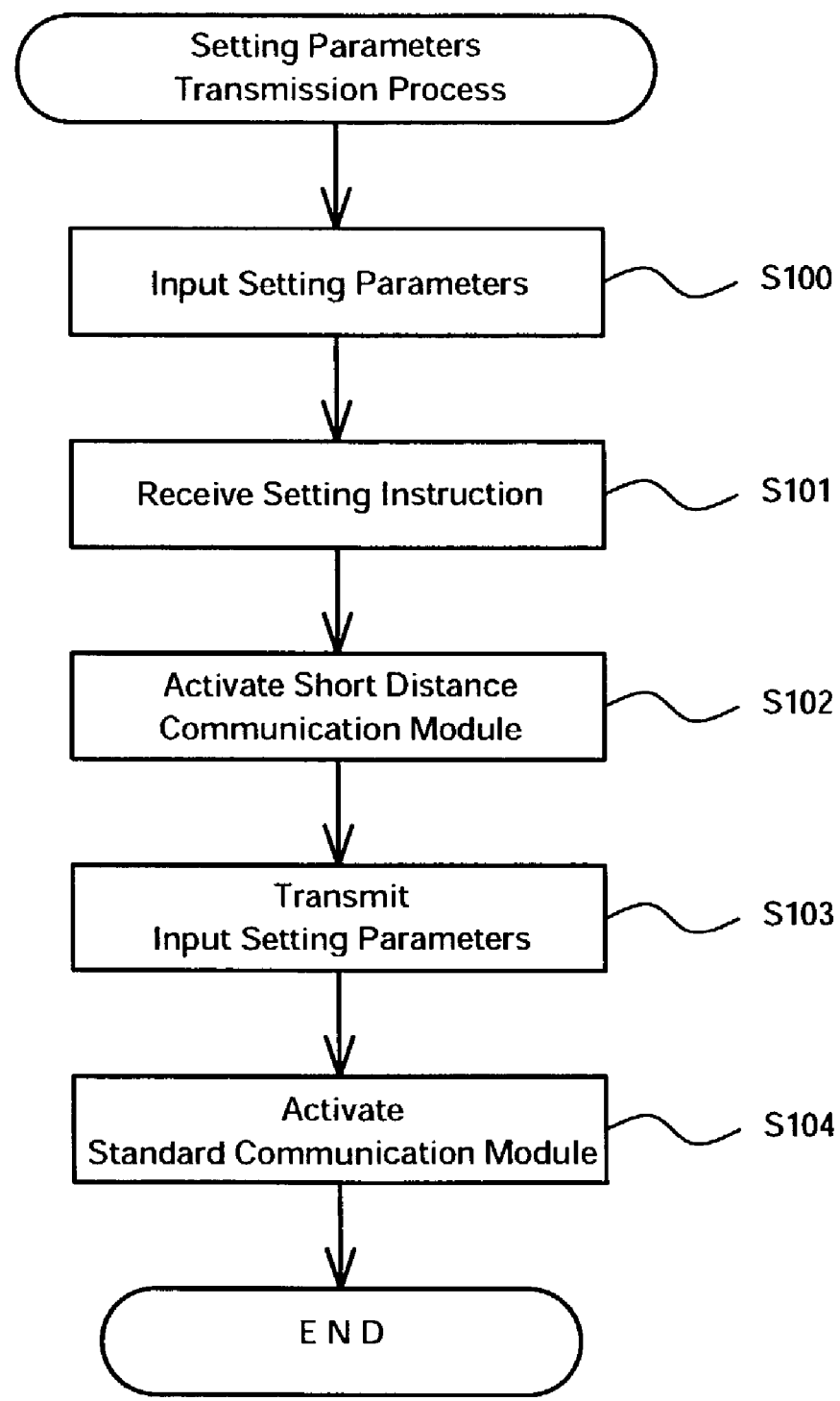
FIG. 4 is a flowchart showing a setting parameters transmission process executed in the first embodiment.

FIG. 4 is a flowchart showing a setting parameters transmission process executed in the first embodiment. In order to establish communication at least between the station ST1 and the radio print server PS, the user sets the radio channel of the station ST1 to the channel '14', specifies the ADHOC mode for the communication mode, and selects the non-use setting of the WEP. These settings are identical with the setting in the radio print server PS and enable direct communication between the station ST1 and the radio print server PS. The user then uses the GUI shown in FIG. 2 and inputs the settings for the wireless network group X into the station ST1 (step S100). On completion of the input, the user clicks the 'Set' button to give the setting instruction (step S101). The station ST1 activates the short distance communication module 11 in response to the setting instruction (step S102) and transmits the input setting parameters to the radio print server PS (step S103).

In the structure of the embodiment, the communicable range of the short distance communication module 11 is approximately 3 meters around. The user should thus locate the radio print server PS within the range of 3 meters around the station ST1. The station ST1 may give a display for asking the user to locate the radio printer server PS sufficiently close to the station ST1. The station ST1 stops the transmission of the setting parameters, in response to input of a response message that is sent from the radio print server PS and represents that the setting parameters have been received, or after elapse of a preset time period. The station ST1 then inactivates the short distance communication module 11 and activates the standard communication module 10 (step S104). On completion of the activation, the program exits from the setting parameters transmission process.

According to the above series of processing, the radio print server PS receives the setting parameters by radio and carries out settings required for communication. The short distance communication module 11 is used for transmission of the setting parameters. This arrangement effectively prevents leakage of the setting parameters to any third person who is beyond the communicable range of the short distance communication module 11 (3 meters in this embodiment). The above description regards the settings for the wireless network group X. The parameters are set arbitrarily. The station ST1 included in the wireless network group X may be utilized to carry out settings for entry in another wireless network group Y.

The above series of transmission process transmits the setting parameters input by the user. The station ST1, however, originally stores the setting parameters for the wireless network group X. In one preferable application, the station ST1 may keep these setting parameters aside, for example, in a memory in the course of establishing communication with the radio print server PS and then transmit these setting parameters to the radio print server PS. This arrangement desirably saves the user's trouble of newly inputting the parameters, in the case where the setting parameters to be transmitted are originally kept in the apparatus for wireless setting.

The above description regards the example of transmitting the setting parameters to the radio print server PS in the ADHOC mode. The transmission of the setting parameters may alternatively be carried out in the infrastructure mode. The station ST1 may implement settings in another wireless communication device, for example, the access point AP, according to a similar series of processing.

B. Second Embodiment

The first embodiment regards the arrangement of utilizing the station ST to carry out the settings in another wireless communication device. The following describes a second embodiment that utilizes an access point to carry out the settings in another wireless communication device.

(B1) Schematic Structure of Access Point

Figure 5:
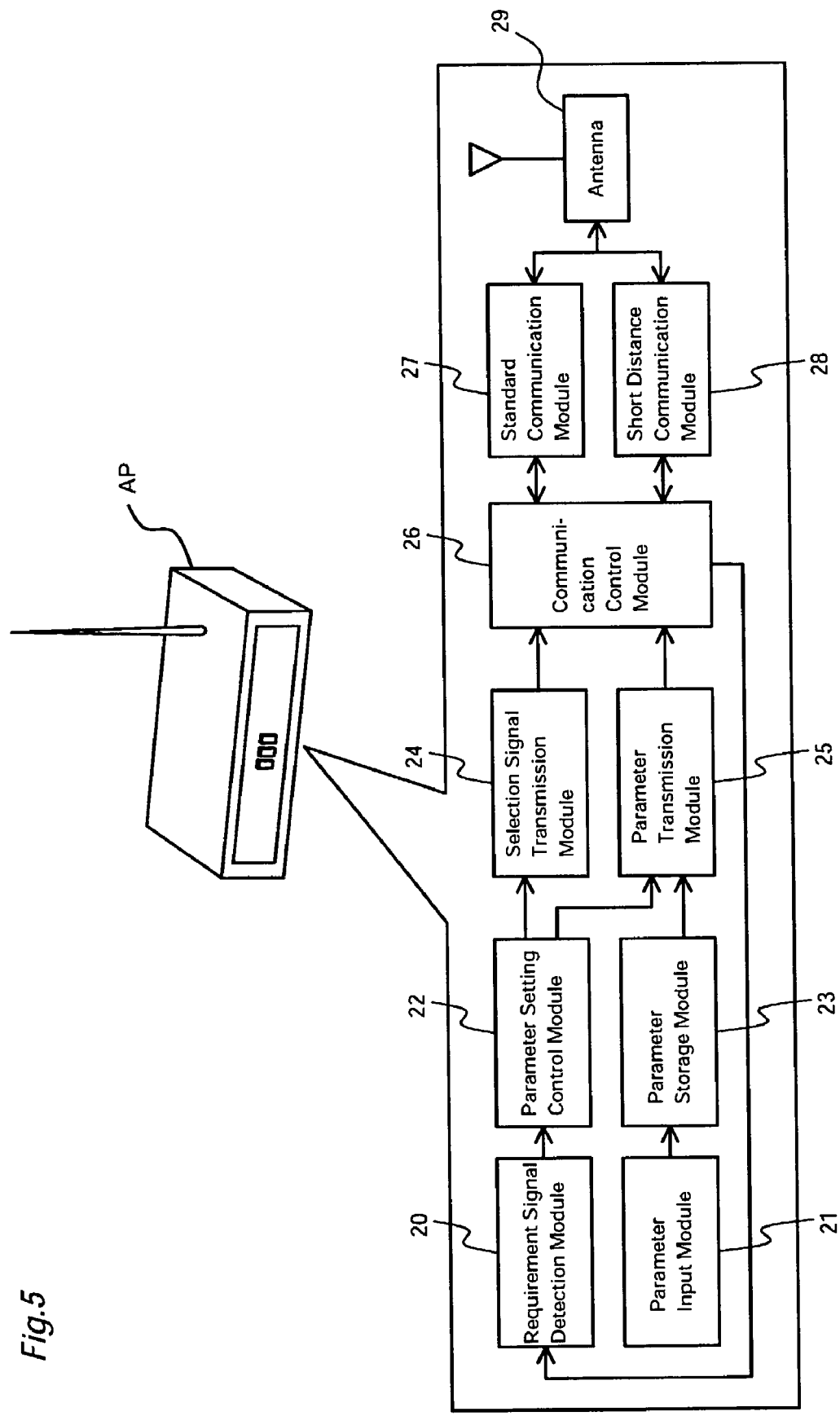
FIG. 5 schematically illustrates the construction of an access point AP in a second embodiment of the present invention.

FIG. 5 schematically illustrates the construction of an access point AP in a second embodiment of the present invention. The access point AP includes a requirement signal detection module 20, a parameter input module 21, a parameter setting control module 22, a parameter storage module 23, a selection signal transmission module 24, a parameter transmission module 25, a communication control module 26, a standard communication module 27, a short distance communication module 28, and an antenna 29. The same functions as those of the first embodiment discussed above with reference to FIG. 1 are expressed by the same names and are not specifically discussed here.

(B2) Outline of Functions of Access Point

The requirement signal detection module 20 gives a setting instruction to the parameter setting control module 22, in response to input of a setting requirement signal from another wireless communication device via the antenna 29, the standard communication module 27 or the short distance communication module 28, and the communication control module 26. The setting requirement signal may be a predetermined request signal that requires the setting parameters. The setting requirement signal may otherwise be a beacon or any other signal that is transmitted from another wireless communication device and includes setting parameters, which are different from the settings kept in the parameter storage module 23 of the access point AP.

The parameter input module 21 inputs the setting parameters in the access point AP. The setting parameters may be input from the station ST by radio, as in the case of the first embodiment. In the case where the access point AP is connected to a wired LAN, the setting parameters may be input from a terminal connecting with the wired LAN. Direct input of the setting parameters may be allowed when the access point AP has an input unit.

(B3) Transmission Process of Setting Parameters

The following describes a process of transmitting the setting parameters, which is executed by the access point AP. In this embodiment, the setting parameters are transmitted to a station. Here the station may be the station ST or the radio print server PS discussed in the first embodiment or a prior art station without the functions of short distance communication. The station is set in an initial factory shipment state. The initial settings in the station are WEP='Not Used' and Communication Mode='Infrastructure'.

In order to establish communication at least between the access point AP and the station, the access point AP has the same setting of the ESS-ID as the ESS-ID set in the station. Here the settings in the station are 'WEP'='Not Used' and Communication Mode='Infrastructure'.

Figure 6:
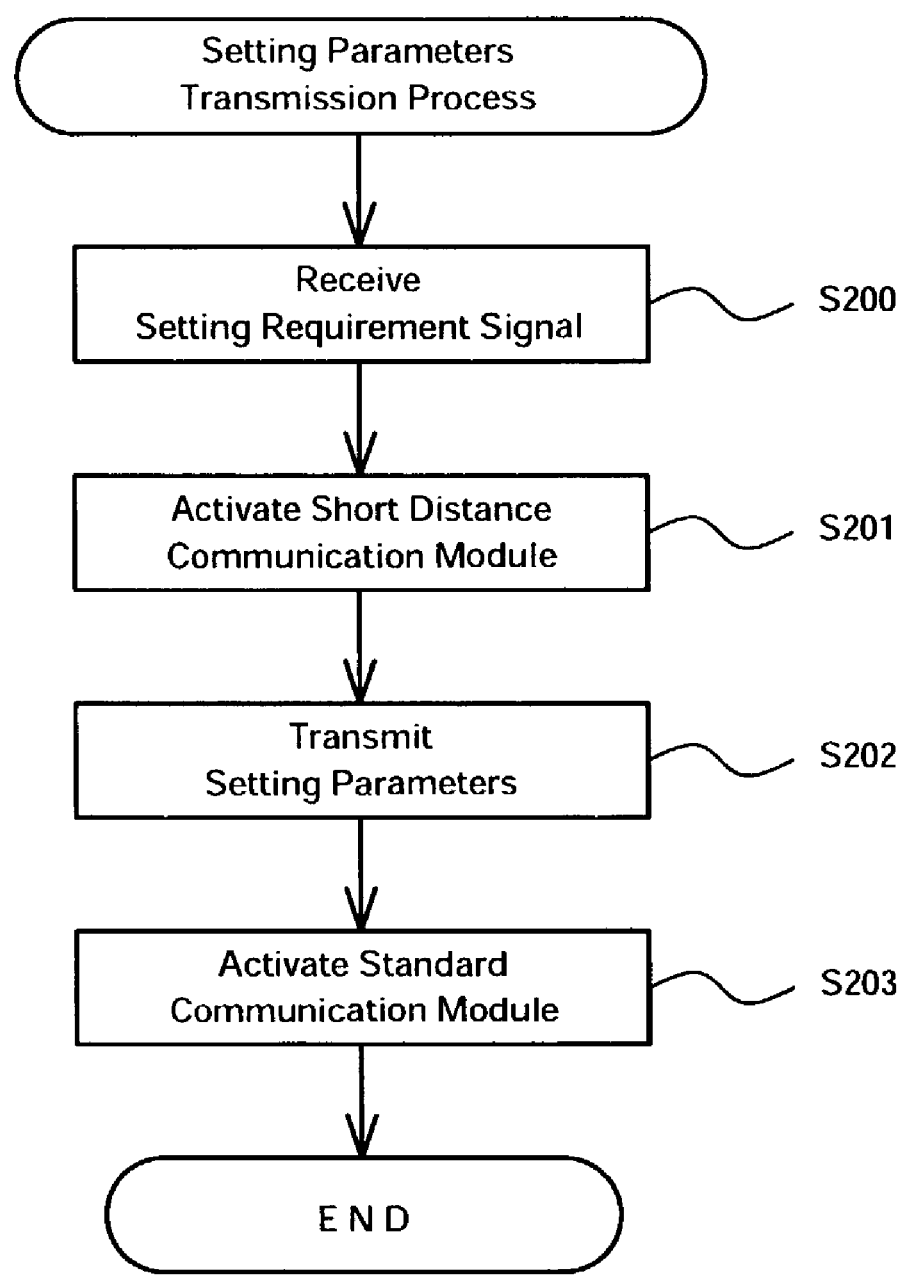
FIG. 6 is a flowchart showing a setting parameters transmission process executed in the second embodiment.

FIG. 6 is a flowchart showing a setting parameters transmission process executed in the second embodiment. The access point AP receives a predetermined setting requirement signal from the station (step S200), activates the short distance communication module 28 (step S201), and transmits the setting parameters, which have been input via the parameter input module 21 (step S202). On completion of transmission, the access point AP inactivates the short distance communication module 28 and activates the standard communication module 27, in response to input of a response message from the station or after elapse of a preset time period (step S203). After the activation, the program exits from the setting parameters transmission process.

According to this series of processing, the access point AP implements settings in the station. The access point AP utilizes the short distance communication module 28 for the settings. This arrangement effectively prevents leakage of important code information, such as the WEP, to any third person who is beyond the communicable range of the short distance communication module 28.

The above description regards the case of transmitting the setting parameters in the infrastructure mode. The transmission of the setting parameters may be carried out in another mode, for example, in the ADHOC mode or in an inter-access point communication mode. The access point AP may also have the functions of the print server or another station. Such combination of the access point with the station enables the communication mode and the functions to be flexibly used according to the communication object.

C. Modifications

The second embodiment regards the case of utilizing the access point AP to carry out settings in the station. The access point AP of the second embodiment may be used for settings in still another wireless communication device via the station. In this modified example, the station transmits a parameter for specifying a target wireless communication device for settings (for example, an MAC address or an IP address), in addition to the setting requirement signal, to the access point AP. The access point AP transmits the setting parameters to the specified target wireless communication device by short distance communication, in response to the input of the setting requirement signal and the specification parameter. The target wireless communication device should be located sufficiently close to the access point AP.

The above embodiments and their modifications are to be considered in all aspects as illustrative and not restrictive. There may be many modifications, changes, and alterations without departing from the scope or spirit of the main characteristics of the present invention. For example, any of the above processing may be actualized by hardware, instead of the software. In the embodiment discussed above, the communicable range of the short distance communication module is 3 meters. This is only an example set for clarity of explanation, and any arbitrary value may be set for the communicable range. The technique of the present invention is not restricted to the wireless communication based on the standard IEEE802.11b, but is applicable to settings between various wireless communication devices including cordless phones, cell phones, and walkie-talkies.

The scope and spirit of the present invention are indicated by the appended claims, rather than by the foregoing description.

What is claimed is:

1. A wireless communication device, comprising:
    a standard communication module that establishes communication with another wireless communication device via radio waves;
    a short distance communication module that utilizes weaker radio waves than the radio waves used by said standard communication module, in order to establish communication with another wireless communication device; and
    a communication control module that switches over active communication between said standard communication module and said short distance communication module,
    wherein said communication control module activates said short distance communication module to transmit setting parameters, which are used to change settings required for communication in said another wireless communication device; and
    wherein said standard communication module and said short distance communication module both use the same antenna.

2. A wireless communication device in accordance with claim 1, wherein said communication control module activates said short distance communication module to transmit the setting parameters, in response to an external transmission instruction of the setting parameters.

3. A wireless communication device in accordance with claim 1, wherein the setting parameters include key information used for encoding and decoding data in the process of communication with another wireless communication device.

4. A wireless communication device in accordance with claim 1, wherein the setting parameters include group information for identifying a network group to be entered.

5. A wireless communication device in accordance with claim 1, wherein said communication control module activates said standard communication module, after transmission of the setting parameters by said short distance communication module.

6. A wireless equipment setting device that utilizes a wireless communication device to carry out settings required for communication in another wireless communication device, said wireless communication device comprising:
　a standard communication module that establishes communication with another wireless communication device via radio waves;
　a short distance communication module that utilizes weaker radio waves than the radio waves used by said standard communication module, in order to establish communication with another wireless communication device; and
　a communication control module that switches over active communication between said standard communication module and said short distance communication module,
wherein:
　said standard communication module and said short distance communication module both use the same antenna,
　said communication control module activates said short distance communication module to transmit setting parameters, which are used to change settings required for communication in said another wireless communication device, and
said wireless equipment setting device comprises:
　a setting parameters storage module that stores the setting parameters;
　a selection signal transmission module that transmits a selection signal for selecting either one of said standard communication module and said short distance communication module to said communication control module; and
　a setting parameters transmission module that transmits the setting parameters to said communication control module.

7. A computer readable recording medium in which a computer program to control a wireless communication device is recorded, said computer program comprising:
　a setting parameters storage function that stores setting parameters which are used to change settings required for communication in another wireless communication device;
　a selection signal transmission function that transmits a selection signal for selecting either one of a standard communication module that establishes communication with another wireless communication device via radio wave and a short distance communication module that utilizes weaker radio waves than the radio waves used by said standard communication module, in order to establish communication with another wireless communication device to said communication control module, wherein said standard communication module and said short distance communication module both use the same antenna; and
　a setting parameters transmission function that transmits the setting parameters to said communication control module.

* * * * *